Feb. 5, 1952        P. L. GUARIN        2,584,867

FLOATABLE BREAKWATER

Filed Oct. 25, 1949        2 SHEETS—SHEET 1

Inventor: Paul L. Guarin

By *[signature]* his Attorney

Feb. 5, 1952 P. L. GUARIN 2,584,867
FLOATABLE BREAKWATER
Filed Oct. 25, 1949 2 SHEETS—SHEET 2

Inventor: Paul L. Guarin
By
his Attorney

Patented Feb. 5, 1952

2,584,867

UNITED STATES PATENT OFFICE 2,584,867

FLOATABLE BREAKWATER

Paul L. Guarin, Houston, Tex., assignor to Shell Development Company, San Francisco, Calif., a corporation of Delaware Application October 25, 1949, Serial No. 123,483

4 Claims. (Cl. 61—5)

This invention relates to a floatable breakwater and pertains more particularly to a device adapted to be positioned at a distance from offshore marine installations to break and smooth out waves which would otherwise impinge upon said installations.

Many marine installations, such as offshore well drilling rigs, offshore well installations, and the like, must be protected from wave action, particularly during the period that drilling operations are carried on. Numerous types of breakwaters have been used for this purpose. Since rigid or immovable breakwaters, of whatever construction or material, are often fractured, overthrown, undermined, or destroyed in a short time by the persistent force of wave action, and since the cost of building and maintaining permanent breakwaters is very great, it is desirable that the breakwaters used around drilling installations be of the non-rigid type. In offshore well drilling operations, the drilling equipment may be located at the drilling side only temporarily, i. e., only while the well is being drilled. After the well is completed, the equipment may be moved to another well site. For use with such portable drilling equipment, it is desirable that protective breakwaters be of the portable type in order to facilitate the movement of the breakwater to a new drilling site. Generally, a protective breakwater is also positioned to protect the completed well installation, although a smaller breakwater may be used for this purpose than the one needed to protect the installation when the well is being drilled.

It is well known that there is both a vertical and a horizontal displacement of water particles in a wave action. The vertical displacement is due to gravity while the horizontal displacement is generally due to wind. Thus, the particles of water on or near the surface of a water wave move in a circular motion and the wave may be described as being orbital in nature. The wave form travels swiftly over the water surface, whereas the water particles oscillate back and forth and scarcely advance. The speed of the wave form is known as wave velocity while the speed of the water particles is called orbital velocity. Forces exerted by the waves on obstacles are primarily due to the orbital motion. The orbital velocities are largest at the surface and they decrease rapidly with depth until they cease entirely at a depth equal to the length of the wave. As waves reach shallow water their velocity diminishes and the circular motion of the water particles that existed in deep water is squeezed to an eliptical motion due to the restrictive effect of the sea bottom.

Most breakwaters used at present are either of the fixed and rigid type, that act as a complete barrier to an entire wave, or of the floating type that act as a drag barrier for the tops of the waves.

It is a primary object of the present invention to provide a breakwater adapted to be positioned and anchored on the ocean floor and extending upward to a point near the surface of the water for breaking up the orbital motion of water waves, thereby reducing the forces exerted by the waves against marine installations.

It is also an object of this invention to provide a breakwater composed of a plurality of readily portable units adapted to be chained or held together by other means and independently anchored.

Another object of this invention is to provide a breakwater comprising a series of wavepervious barriers anchored below the surface in a line substantially parallel to that of the waves, whereby the waves are caused to pass through successive pervious barriers which successively break down the orbital motion of the waves.

A still further object of the present invention is to provide floatable breakwater units which may be floated to and sunk at any desired location and subsequently re-floated for easy transfer to another location.

Other objects and advantages will become apparent from the following detailed description taken with reference to the drawing, wherein.

Figure 1:
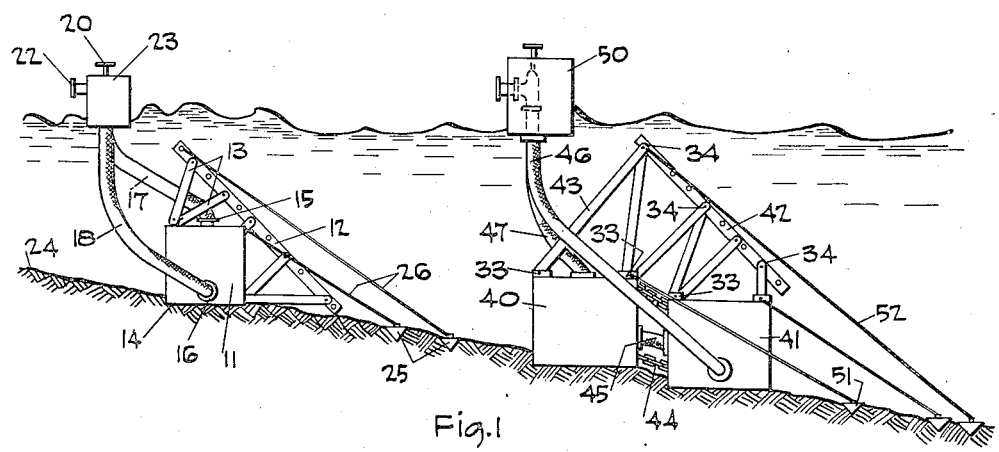
Figure 1 is a diagrammatic view of two of the present breakwater units anchored on the ocean floor.

Referring to Figure 1 of the drawing, a breakwater unit of the present invention may comprise a hollow, elongated fluidtight housing or pontoon 11 having a screen or grid 12 secured to one side and/or the top thereof by hinge or support members 13. The hinge members 13 are preferably adjustable as to length and position whereby the grid 12 may be fixed at approximately the desired angle with regard to the housing 11. The pontoon 11 has preferably a flat bottom 14 to give it more stability when it serves as the base support for the grid barrier 12. If desired, the pontoon may be suitably loaded to insure that it will always come to rest with its bottom on the ocean floor. The hollow pontoon is equipped with fluid inlet and outlet ports 15 and 16, respectively, to which are connected flexible conduits 17 and 18. The other end of the conduits 17 and 18 may be closed by valves 19 and 20 having couplings 21 and 22 to which may be connected conduits from a pump or air compressor carried on a barge for purposes of flooding or emptying the pontoon.

The valved ends of the flexible conduits 17 and 18 are carried by a floating buoy or pontoon 23, which, because of its relatively small size and the flexibility of the conduits, offers little resistance to the wave action. If desired, the pontoon 11, when flooded and positioned on the ocean floor 24, may be additionally stabilized by suitable anchoring means such as anchors 25 and anchoring chains or cables 26 which may be secured to the pontoon 11 or grid 12 in any suitable manner.

Figures 2, 3:
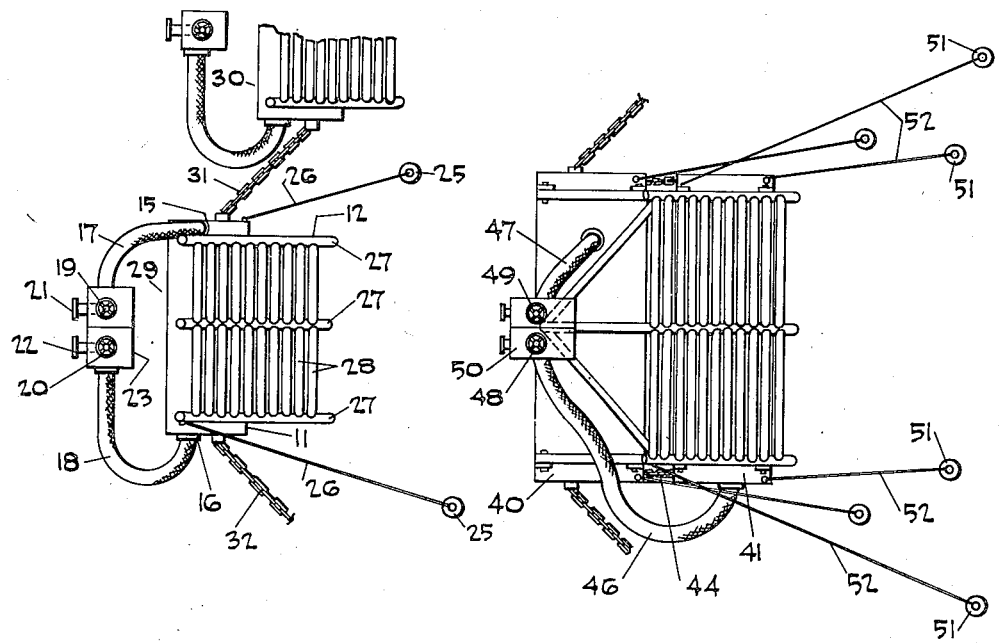
Figures 2 and 3 are top views of the breakwater units of Figure 1.

The grid or screen 12 may be of any suitable size and design. As shown in Figure 2, the grid may comprise two or more support bars 27 to which are secured, at right angles, a plurality of substantially evenly spaced cross bars 28. The bars 27 and 28 may be fixedly secured together in any suitable manner, as by bolting, welding, or the like, and may be of any desired length, shape or spacing. Preferably, the open area of the grid 12 is equal to about one-half the area within the periphery of the grid. The grid 12 may be mounted at any desired angle on top of the pontoon 11. The grid is normally fixedly set at substantially a 45 degree angle with the surface of the water, as illustrated in Figure 1, although it may deviate from such position by at least 30° in each direction, according to circumstances. With the grid slanted in the position shown, the various portions of a wave hit and pass through the grid in succession whereby the grid is not subjected to the impact of the total energy of the wave at any one moment.

As shown in Figure 2, a plurality of breakwater units 29 and 30 may be positioned side by side and secured together and to other similar units by chains 31 and 32, cables or the like.

It may be seen from the embodiment of the present breakwater diagrammatically illustrated in Figures 1 and 3, that the base member of the breakwater may comprise more than one pontoon, such as pontoons 40 and 41, upon which a grid 42 may be mounted by hinge or support members 43. The support members 43 are preferably secured to the pontoons 40 and 41 by articulated or pivoted connections 33 and 34 to insure that the grid 42 will be at least 30 degrees to horizontal when the pontoons rest on the ocean floor. The two pontoons 40 and 41 may be secured together by cables or chains 44 and the interiors of said pontoons may be in communication through a flexible conduit 45 whereby both pontoons may be simultaneously filled or emptied by pumping air or water through other flexible conduits 46 and 47. One end of said conduits 46 and 47 are normally closed by valves 48 and 49 which are suitably secured to a buoy or pontoon 50. If desired, the pontoons 40 and 41 may be more securely anchored by suitable anchors 51 and anchor chains 52 which may be affixed to any point on the pontoons 40 and 41 or the grid 42.

Figure 4:
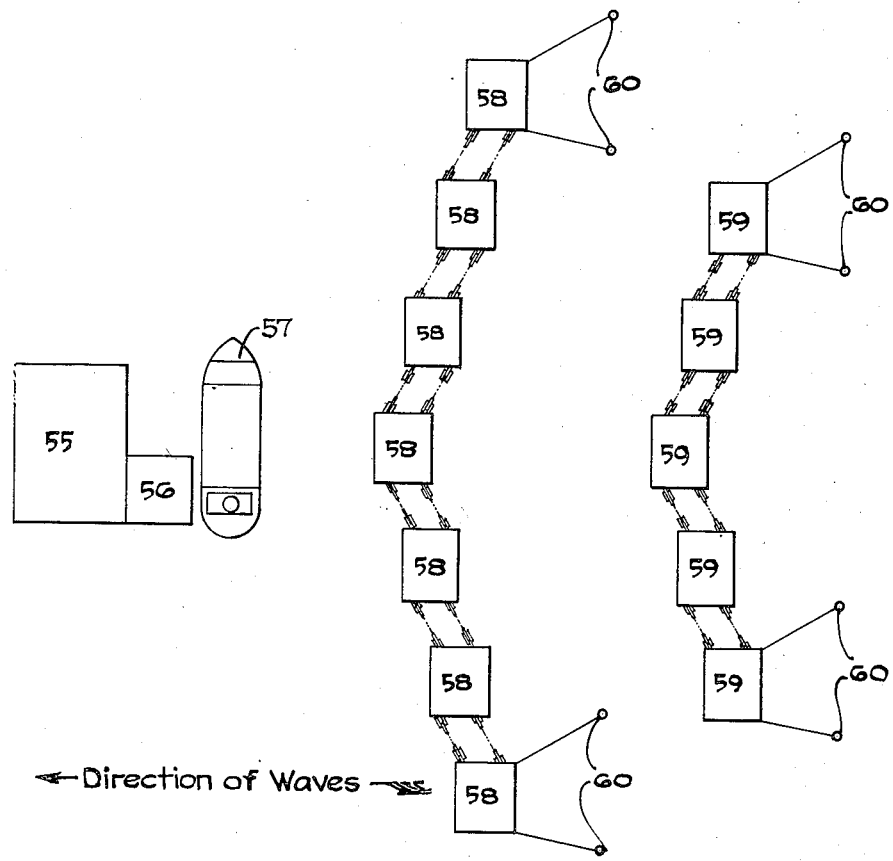
Figure 4 is a schematic diagram illustrating a marine installation protected by breakwater barriers according to the present invention.

As schematically shown in Figure 4, an offshore well drilling installation may comprise, for example, an operating platform 55, a storage platform 56, a barge 57 moored alongside, and/or other related equipment well known to the art. In order to protect the installation from wave action, a plurality of the present breakwater units, as represented at 58, are secured together by cables or chains 59 and anchored at a distance from the drilling installation on the weather side thereof. Preferably, each of the breakwater units 58 is supplied with independent anchoring means 60 whereby a series of said units may be anchored in a line, arc, or any other desired contour at any predetermined distance from the drilling installation, as shown in Figure 3.

In forming a breakwater barrier, several units are chained or tied together by other means and the pontoons are filled with air. The series of breakwater units are then towed to the desired location where each of the pontoons is flooded by opening valves 19 and 20 (Figure 2) and introducing water into the pontoons either by pumping or any other means. When pumping is used the flooding is accomplished by attaching a hose (not shown) to coupling 21 or 22 with the other end of the hose being attached to a pump (not shown) on the barge whereby water may be pumped into said pontoons causing the breakwater structure to sink to the ocean floor. When the breakwater unit is in its predetermined position, it may be suitably anchored.

Preferably, a second breakwater barrier also comprising a number of breakwater units, as represented at 59 (Figure 3), is towed to and sunk in a line of substantially the same contour as said first breakwater barrier and at a distance therefrom. The height of the breakwater units 58 and 59 is previously selected or adjusted so that the screen or grid 12 (Figure 1) is positioned near or just below the surface of the water.

As already stated hereinabove, it is the general purpose of this invention to provide means for the dissipation of wave energy by stages. This is in contrast with permanent breakwaters which must be built sufficiently large to stop the wave motion and dissipate the wave energy in one stage. The grid or screen feature of the present breakwater unit is so designed that a partial, rather than complete, interference with subsurface water movement is effected. The pervious grids of the present breakwater units interfere with the orbital motion of the waves, thereby reducing the forces exerted by said waves against a marine installation. When the orbital motion of the waves has been subjected to interferences a sufficient number of times by succeeding breakwater units, the waves are caused to dissipate most of their energies before reaching the offshore drilling installation.

If desired, when the marine drilling installation is moved to another location, the breakwater barriers may be re-floated and towed to the new drilling site. On the other hand, the breakwater barriers may be left in position at the completed well installation to act as a permanent breakwater barrier. In re-floating the individual units, an air hose, connected to a compressor and carried by a barge (not shown), may be connected to a coupling 21 (Figure 2). Both valves 19 and 20 are then opened and compressed air is introduced into the pontoon 11 until the breakwater unit floats. Valves 19 and 20 are then closed and the air hose is disconnected from the coupling 21. The other breakwater units are re-floated in a similar manner. The anchors 25 may be disconnected from the anchor cables 26 and carried by the barge (not shown) to the new location.

It is to be noted that an especially desirable feature of the present breakwater unit is that the valves 19 and 20 (Figure 2) and the couplings 21 and 22 of the conduits 17 and 18 are secured to a buoy whereby they remain above the surface of the water at all times and are readily available for flooding and re-floating operations. The length of the flexible conduits 17 and 18 is necessarily at least as great as the depth of water in which the breakwater unit is located.

I claim as my invention:

1. A floatable breakwater unit adapted to be towed to a pre-determined location and sunk on the ocean floor, said breakwater unit comprising an elongated flat-bottom fluidtight pontoon, a rigid water-pervious grid member, pivoted support means adjustable as to length and angular position for securing said grid member to said pontoon, said grid member projecting substantially upwardly from said pontoon at substantially a 45 degree angle to the horizontal to a point near the ocean surface, port means in said pontoon whereby a liquid and a gas may be alternately introduced for sinking and floating said breakwater unit, flexible conduit means having one end thereof connected to said port means, coupling means at the other end of said conduit means, valve means in said conduit means adjacent said coupling means, and a buoyant member affixed to said conduit means for supporting said coupling and valve means above water at all times.

2. A floatable breakwater unit adapted to be towed to a pre-determined location and sunk on the ocean floor, said breakwater unit comprising an elongated fluidtight pontoon, a rigid grid member, articulated means connecting said grid member to said pontoon, whereby said grid member is caused to assume an angle of at least 30 degrees to the horizontal when said pontoon rests on the ocean floor, port means in said pontoon whereby a liquid and a gas may be alternately introduced for sinking and floating said breakwater unit, flexible conduit means having one end thereof connected to said port means, coupling means at the other end of said conduit means, valve means in said conduit means adjacent said coupling means, and a buoyant member affixed to said conduit means for supporting said coupling and valve means above water at all times.

3. A floatable breakwater unit adapted to be towed to a pre-determined location and sunk on the ocean floor, said breakwater unit comprising an elongated flat-bottom fluidtight pontoon, a rigid water-pervious grid member, pivoted support means adjustable as to length and angular position for securing said grid member to said pontoon, said grid member projecting substantially upwardly from said pontoon at substantially a 45 degree angle to the horizontal to a point below the ocean surface, port means in said pontoon whereby a liquid and a gas may be alternately introduced for sinking and floating said breakwater unit, flexible conduit means having one end thereof connected to said port means, coupling means at the other end of said conduit means, valve means in said conduit means adjacent said coupling means, a buoyant member affixed to said conduit means for supporting said coupling and valve means above water at all times, anchoring means carried by said breakwater unit and adapted to be sunk therewith, and flexible cable means securing said anchoring means to said pontoon.

4. A floatable breakwater unit adapted to be towed to a pre-determined location and sunk on the ocean floor, said breakwater unit comprising a pair of elongated flat-bottom fluidtight pontoons, a rigid water-pervious grid member, pivoted support means adjustable as to length and angular position for securing said grid member to said pontoons, said grid member projecting substantially upwardly from said pontoons at substantially a 45 degree angle to the horizontal to a point below the ocean surface, port means in said pontoons whereby a liquid and a gas may be alternately introduced for sinking and floating said breakwater unit, flexible conduit means having one end thereof connected to said port means, coupling means at the other end of said conduit means, valve means in said conduit means adjacent said coupling means, a buoyant member affixed to said conduit means for supporting said coupling and valve means above water at all times, anchoring means carried by said breakwater unit and adapted to be sunk therewith, and flexible cable means securing said anchoring means to said pontoons and to said grid member.

PAUL L. GUARIN.

REFERENCES CITED

The following references are of record in the file of this patent:

UNITED STATES PATENTS

| Number | Name | Date |
| --- | --- | --- |
| 335,032 | Leeds | Jan. 26, 1886 |
| 902,372 | Cameron | Oct. 27, 1908 |
| 1,004,718 | Wieland | Oct. 3, 1911 |

FOREIGN PATENTS

| Number | Country | Date |
| --- | --- | --- |
| 20,072 | Great Britain | of 1894 |